United States Patent
Huang et al.

(10) Patent No.: US 9,808,793 B1
(45) Date of Patent: Nov. 7, 2017

(54) CATALYST APPLIED IN HYDROGEN PRODUCTION BY LOW TEMPERATURE PARTIAL OXIDATION OF LIGHT HYDROCARBON

(71) Applicant: National Tsing Hua University, Hsinchu (TW)

(72) Inventors: Yu-Chen Huang, Hsinchu (TW); Hsin-Yi Liu, Hsinchu (TW)

(73) Assignee: National Tsing Hua University (TW)

( * ) Notice: Subject to any disclaimer, the term of this patent is extended or adjusted under 35 U.S.C. 154(b) by 0 days.

(21) Appl. No.: 15/377,616

(22) Filed: Dec. 13, 2016

(30) Foreign Application Priority Data

Sep. 7, 2016 (TW) .............................. 105128896 A

(51) Int. Cl.
| | | |
|---|---|---|
| *B01J 21/06* | (2006.01) | |
| *B01J 23/10* | (2006.01) | |
| *B01J 23/755* | (2006.01) | |
| *B01J 23/83* | (2006.01) | |
| *B01J 23/89* | (2006.01) | |

(52) U.S. Cl.
CPC ............. *B01J 23/894* (2013.01); *B01J 23/83* (2013.01)

(58) Field of Classification Search
CPC . B01J 23/10; B01J 23/755; B01J 23/83; B01J 23/892; B01J 23/894; B01J 21/066
See application file for complete search history.

(56) References Cited

U.S. PATENT DOCUMENTS

| | | | | |
|---|---|---|---|---|
| 4,539,310 A | * | 9/1985 | Leftin ...................... | B01J 23/83 502/302 |
| 5,179,059 A | * | 1/1993 | Domesle .............. | B01D 53/945 423/213.5 |
| 5,478,543 A | * | 12/1995 | Murota ..................... | B01J 23/10 423/263 |
| 5,580,536 A | * | 12/1996 | Yao .......................... | B01J 23/10 264/614 |
| 5,989,457 A | * | 11/1999 | Seshan ................... | B01J 21/066 252/373 |
| 6,060,420 A | * | 5/2000 | Munakata ............ | B01D 53/945 502/302 |
| 6,150,299 A | * | 11/2000 | Umemoto ................ | B01J 23/10 423/213.2 |
| 6,326,329 B1 | * | 12/2001 | Nunan ................. | B01D 53/945 502/242 |

(Continued)

*Primary Examiner* — Cam N. Nguyen

(57) ABSTRACT

Differing from the startup temperature of partial oxidation of butane (POB) reaction stimulated by conventional rhodium-based or nickel-based catalyst reaches 700° C. or above, the present invention particularly discloses a novel catalyst consisting of fluorite-type oxide support and Ni active metal for being applied in hydrogen production by low temperature partial oxidation of light hydrocarbon (POLH), so as to effectively reduce the startup temperature of the POLH reaction. In the present invention, the said light hydrocarbon means methane, ethane, propane, or butane. Moreover, a variety of experimental data have proved that this novel catalyst makes the startup temperature of POB reactions be lowered to 250° C. On the other hand, the experimental data have also proved that, the carbon deposition formed on the catalyst during POB reaction can be obviously improved after adding a few amount of platinum into the constituting ingredients of the novel catalyst.

6 Claims, 10 Drawing Sheets

(56) References Cited

U.S. PATENT DOCUMENTS

| | | | | |
|---|---|---|---|---|
| 6,402,989 | B1* | 6/2002 | Gaffney | B01J 23/755 252/373 |
| 6,506,705 | B2* | 1/2003 | Blanchard | B01J 23/10 502/300 |
| 7,314,846 | B2* | 1/2008 | Kuno | B01J 23/10 502/304 |
| 7,384,888 | B2* | 6/2008 | Kuno | B01D 53/945 502/302 |
| 7,935,654 | B2* | 5/2011 | Choi | B01J 23/002 502/302 |
| RE45,083 | E* | 8/2014 | Kuno | B01J 23/10 423/213.2 |
| 8,859,453 | B2* | 10/2014 | Hong | B01J 23/755 252/373 |
| 2002/0115563 | A1* | 8/2002 | Blanchard | B01J 23/10 502/304 |
| 2004/0054016 | A1* | 3/2004 | Lu | B01J 19/0093 518/726 |
| 2006/0009352 | A1* | 1/2006 | Zhao | B01J 23/58 502/302 |
| 2007/0179053 | A1* | 8/2007 | Lee | B01J 23/002 502/304 |
| 2007/0203021 | A1* | 8/2007 | Nakamura | B01D 53/945 502/304 |
| 2010/0285950 | A1* | 11/2010 | Le Van Mao | B01J 21/04 502/65 |
| 2013/0065751 | A1* | 3/2013 | Hong | B01J 23/755 502/259 |

* cited by examiner

CATALYST APPLIED IN HYDROGEN PRODUCTION BY LOW TEMPERATURE PARTIAL OXIDATION OF LIGHT HYDROCARBON

BACKGROUND OF THE INVENTION

1. Field of the Invention

The present invention relates to the technology field of the production of hydrogen by partial oxidation of butane (POB), and more particularly to a catalyst applied in hydrogen production by low temperature partial oxidation of light hydrocarbon.

2. Description of the Prior Art

Fuel cell (FC) is considered to be an electrochemical energy conversion device having environmental protection ability because it generates electricity by a chemical reaction of positively charged hydrogen ions with oxygen or other oxidizing agents. Hydrogen is a chemical element with chemical symbol "H" and has the lightest atomic weight compared to others chemical element on the periodic table. However, for being too light to stay permanently in the gravity well, hydrogen tends to escape into space. So that, reforming technology is applied in fuel cell for producing hydrogen from other hydrocarbons due to pure hydrogen gas is scarce in Earth's atmosphere. There are several hydrogen producing methods been proposed and known, including:
(1) coal gasification;
(2) steam reforming of natural gas, liquefied petroleum gas (LPG) or naphtha; and
(3) partial oxidation of natural gas, LPG, naphtha, or heavy oil.

Partial oxidation (POX) is a good way to produce syngas/$H_2$ by disposing any hydrocarbons in a high-temperature environment filled with limited oxygen. On the other hand, catalyst is particularly used in hydrogen producing way of catalytic partial oxidation (CPOX) for reducing the required temperature to around 800° C.-900° C. It is worth noting that, even though there exist several hydrogen storing method including compression in gas cylinders, storage as a cryogenic (liquid), and storage in a metal absorber, it is difficult and dangerous to get a large mass of hydrogen into a small space needs by high pressure and low temperature. Consequently, hydrogen fuel has the reputation of being unsafe. Accordingly, one of the attractive hydrocarbon fuels recently investigated for hydrogen production in fuel cell applications is liquefied petroleum gas (LPG).

LPG is a mixture of gases, mainly propane and butane, produced from petroleum or natural gas. LPG is a liquid under moderate pressure and a favourable feedstock for distributed hydrogen production since it is easy to store and transport. Currently, LPG has been widely used for industrial and house-hold purposes. For LPG consists of 50% propane and 50% butane, some hydrogen producing method by using butane as raw material are therefore developed and proposed, such as following two:

1. Stream Reforming of Butane (SRB)

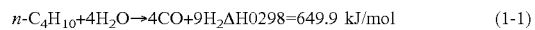

$n\text{-}C_4H_{10} + 4H_2O \rightarrow 4CO + 9H_2\, \Delta H0298 = 649.9\ \text{kJ/mol}$   (1-1)

2. Partial Oxidation of Butane (POB)

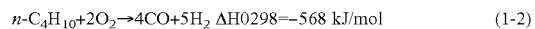

$n\text{-}C_4H_{10} + 2O_2 \rightarrow 4CO + 5H_2\, \Delta H0298 = -568\ \text{kJ/mol}$   (1-2)

From the chemical equations (1-1) and (1-2), it is able to know that a reaction temperature supplied to startup the SRB reaction must reach 700-1100° C. since SRB reaction is an endothermic reaction; moreover, continuously supplying heat to maintain the ongoing of SRB reaction is necessary. On the contrary, POB reaction is an exothermic reaction, such that the POB reaction can be kept by the heat released by its self after supplying a startup temperature to reactor for stimulating the POB reaction.

Specific active metals for example, transition metals and noble metals, are often used as catalysts when applying the POB process. A variety of catalysts containing different active metals are listed in following Table (1).

TABLE 1

| No. | Catalyst composition | Reaction method | Startup temperature (° C.) | Conversion rate (%) | $H_2$ yield (%) |
|---|---|---|---|---|---|
| 1' | Active metal: Rh<br>Support for carrying active metal: $ZrO_2$ | SRB | 500 | 82.6 | 61.9 |
| 2' | Active metal: Ru<br>Support for carrying active metal: $ZrO_2$ | SRB | 450 | 53.8 | 55.3 |
| 3' | Active metal: Rh<br>Support for carrying active metal: $Al_2O_3$ | POB | 750 | 100 | 80 |
| 4' | Active metal: Rh<br>Support for carrying active metal: Ce—$ZrO_2$ | POB | 550 | 91.3 | — |
| 5' | Active metal: Ni<br>Support for carrying active metal: zeolite | POB | 700 | 89 | 62 |

From Table (1), it can find that, no matter taking the composition consisting of $Al_2O_3$ support and Rh active metal or the composition constituted by zeolite support and Ni active metal as the catalyst, the startup temperature for stimulating POB reaction does still need to reach at least 700° C. It is worth noting that, when the process temperature of the POB reaction exceeds 700° C., Ni-based catalyst composition would deactivate due to carbon formation and the active metal's sintering. On the contrary, when it takes the composition consisting of Ce—$ZrO_2$ support and Rh active metal as the catalyst, the POB reaction would be activated under the startup temperature of 550° C. So that, the data showed by Table (1) has implied that ceria-zirconia (Ce—$ZrO_2$), one kind of fluorite-type oxide and also called partially stabilized zirconia (PSZ), is admirably suited for being the support to carry the active metal of the catalyst composition used in POB reaction.

However, even though the catalyst constituted by Ce—$ZrO_2$ support and Rh active metal can effectively enhance the conversion rate and $H_2$ yield of POB reaction, it needs to consider that the high manufacturing cost contributed by noble metals causes the fuel cell be hard to be popularized due to its high selling price.

In view of the conventionally-provided catalysts showing drawbacks and shortcomings, the inventors of the present application have made great efforts to make inventive research thereon and eventually developed a novel and inventive catalyst consisting of fluorite-type oxide support and Ni active metal for being applied in hydrogen production by low temperature partial oxidation of light hydrocarbon.

SUMMARY OF THE INVENTION

The primary objective of the present invention is to provide a novel and inventive catalyst. Differing from the startup temperature of partial oxidation of butane (POB) reaction stimulated by conventional rhodium-based or nickel-based catalyst reaches 700° C. or above, the present invention particularly discloses a novel catalyst consisting of fluorite-type oxide support and Ni active metal for being applied in hydrogen production by low temperature partial oxidation of light hydrocarbon (POLH), so as to effectively reduce the startup temperature of the POLH reaction. In the present invention, the said light hydrocarbon means methane, ethane, propane, or butane. Moreover, a variety of experimental data have proved that this novel catalyst makes the startup temperature of POB reactions be lowered to 250° C. On the other hand, the experimental data have also proved that, the carbon deposition formed on the catalyst during POB reaction can be obviously improved after adding a few amount of platinum into the constituting ingredients of the novel catalyst.

In order to achieve the primary objective of the present invention, the inventors provide one embodiment of the catalyst for being applied in hydrogen production by low temperature partial oxidation of light hydrocarbon, comprising:

an oxide support, comprising a first metallic oxide and a second metallic oxide;
a first active metal, being carried by the oxide support;
wherein the first active metal is nickel (Ni) and the second metallic oxide is a fluorite-type oxide; moreover, the first active metal, a first metal contained by the first metallic oxide, and a second metal contained by the second metallic oxide have a first weight ratio, and the first weight ratio being in a range from 30:0:70 to 30:70:0.

Particularly, the embodiment of the catalyst further comprises a second active metal, and the second active metal, the first active metal, the first metal, and the second metal have a second weight ratio ranged between 0:30:0:70 and 1:30:70:0.

In the embodiment of the catalyst, the first metallic oxide is zirconia ($ZrO_2$) and the said fluorite-type oxide can be cerium oxide ($CeO_2$), hafnium oxide ($HfO_2$) or thorium oxide ($ThO_2$).

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a catalyst for being applied in hydrogen production by low temperature partial oxidation of light hydrocarbon (POLH) according to the present invention, embodiments of the present invention will be described in detail with reference to the attached drawings hereinafter.

The primary objective of the present invention is to provide a novel and inventive catalyst for being applied in hydrogen production by low temperature partial oxidation of light hydrocarbon (POLH), wherein the said hydrocarbon can be methane, ethane, propane, butane, or combination of the aforesaid two or more hydrocarbons. Herein, it needs to further explain that, "low temperature" is a relative term in this specification but not used for describing a real low temperature (e.g., 0° C.). The term of "low temperature" means that: comparing to the process temperature of conventional hydrogen production by partial oxidation of butane (POB) reaction is greater than 700° C., the startup temperature of hydrogen production by partial oxidation of light hydrocarbon (POLH) can be effectively reduced when this novel catalyst is applied in the chemical reaction of POLH.

This novel catalyst mainly consists of a first active metal and an oxide support for carrying the first active metal. It is worth explaining that, the oxide support consists of a first metallic oxide and a second metallic oxide. Moreover, the first active metal is nickel (Ni) and the first metallic oxide is zirconia ($ZrO_2$). On the other hand, the second metallic oxide is a fluorite-type oxide such as cerium oxide ($CeO_2$), hafnium oxide ($HfO_2$) or thorium oxide ($ThO_2$). It is worth noting that, the said first active metal (Ni) is in the form of NiO rather Ni attached onto the oxide support.

In order to make the startup temperature of hydrogen production by partial oxidation of light hydrocarbon (POLH) be effectively reduced when the novel catalyst of the present invention is applied in the chemical reaction of POLH, a first weight ratio is designed between the first active metal, a first metal contained by the first metallic oxide, and a second metal contained by the second metallic oxide; wherein the first weight ratio is in a range from 30:0:70 to 30:70:0.

First Embodiment

In the first embodiment, nickel (Ni), cerium (Ce) and zirconium (Zr) are used as the first active metal, the first metal and the second metal, respectively. Moreover, several catalyst samples containing Ni, Ce and Zr by different weight ratio are integrated in following Table (2).

TABLE 2

| Catalyst samples | | first weight ratio | | | |
|---|---|---|---|---|---|
| | Abbreviated | (%) | | | |
| No. | Symbol | Ni | Ce | Zr | Ce/Zr |
| 1 | NCZ(3-0-7) | 30 | — | 70 | — |
| 2 | NCZ(3-2-5) | 30 | 20 | 50 | 0.4 |
| 3 | NCZ(3-3.5-3.5) | 30 | 35 | 35 | 1 |
| 4 | NCZ(3-5-2) | 30 | 50 | 20 | 2.5 |
| 5 | NCZ(3-7-0) | 30 | 70 | — | — |

Figure 1A:
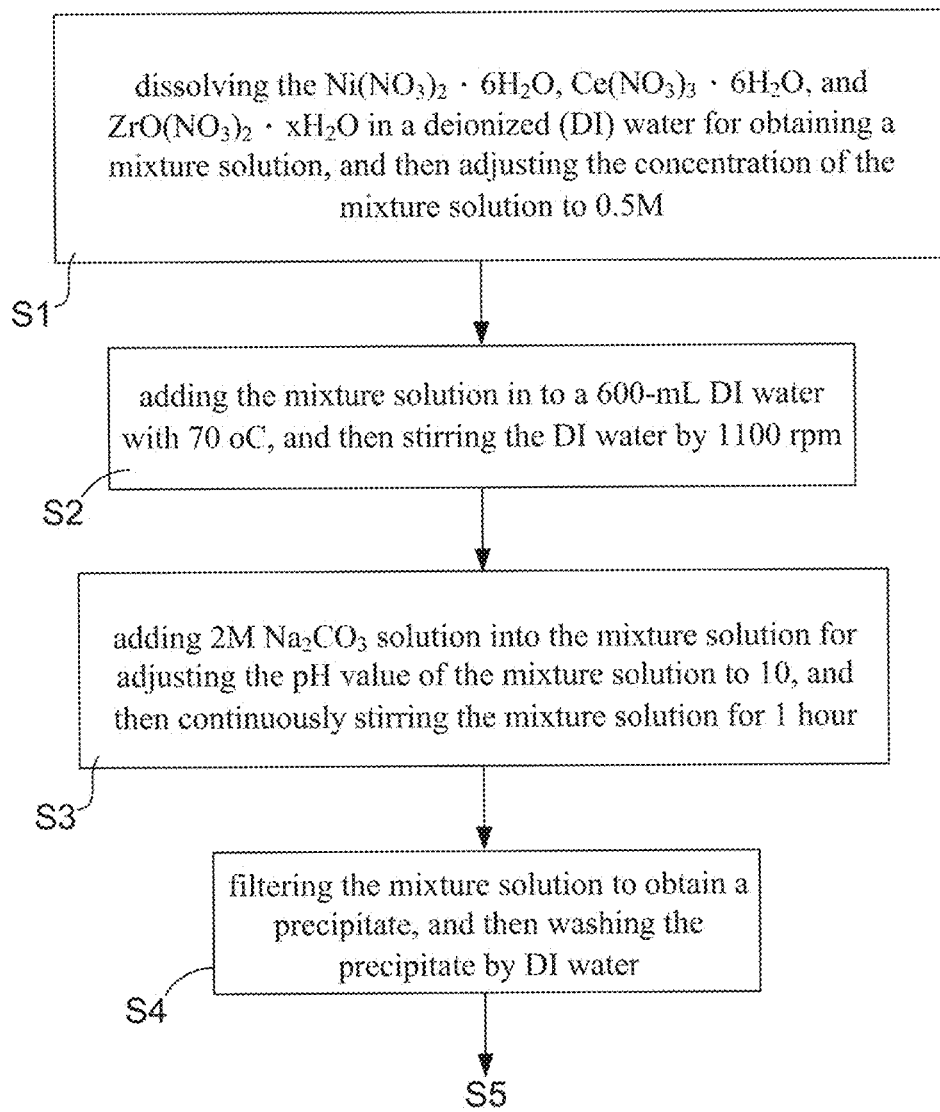
FIG. 1A and FIG. 1B show flow charts of method steps for manufacturing a novel catalyst disclosed by the present invention.
Figure 1B:
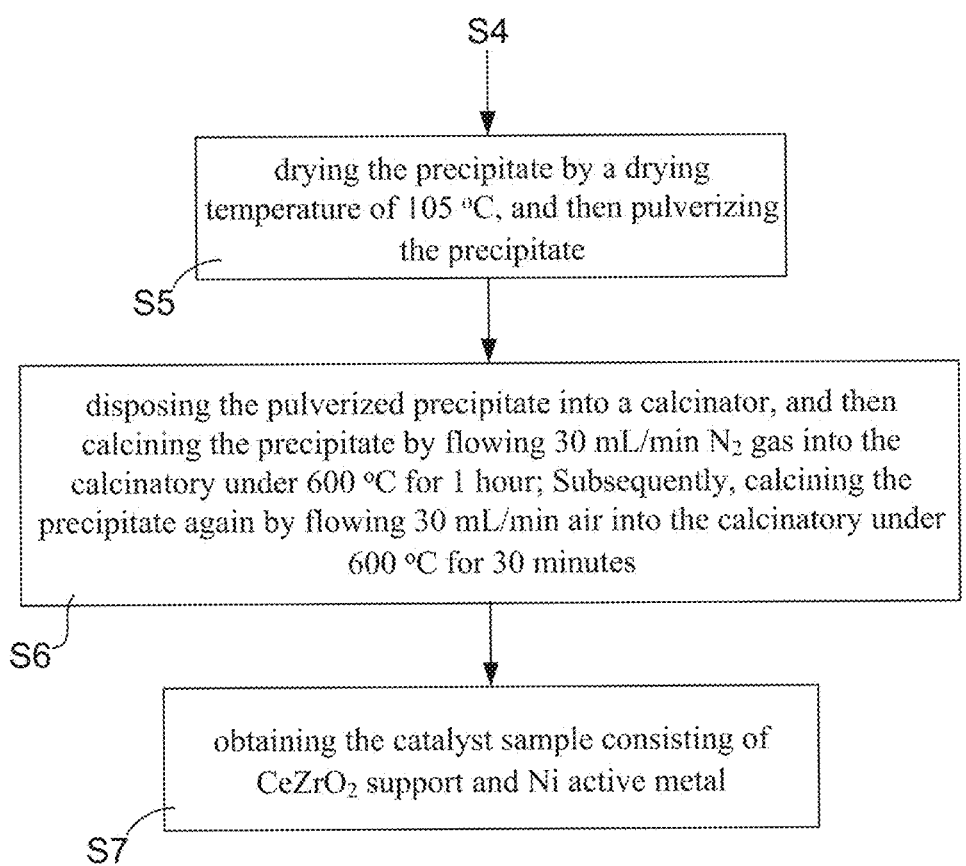

Please refer to FIG. 1A and FIG. 1B, where flow charts of method steps for manufacturing this novel catalyst are provided. According to the provided method steps and the first weight ratio, engineers skilled in the development and fabrication of catalyst composition can easily to carry out the production of the 5 catalyst samples. The method mainly consists of following process steps:

Step S1: dissolving the $Ni(NO_3)_2 \cdot 6H_2O$, $Ce(NO_3)_3 \cdot 6H_2O$, and $ZrO(NO_3)_2 \cdot xH_2O$ in a deionized (DI) water for obtaining a mixture solution, and then adjusting the concentration of the mixture solution to 0.5M;

Step S2: adding the mixture solution in to a 600-mL DI water with 70° C., and then stirring the DI water by 1100 rpm;

Step S3: adding 2M $Na_2CO_3$ solution into the mixture solution for adjusting the pH value of the mixture solution to 10, and then continuously stirring the mixture solution for 1 hour;

Step S4: filtering the mixture solution to obtain a precipitate, and then washing the precipitate by DI water;

Step S5: drying the precipitate by a drying temperature of 105° C., and then pulverizing the precipitate;

Step S6: disposing the pulverized precipitate into a calcinator, and then calcining the precipitate by flowing 30 mL/min $N_2$ gas into the calcinatory under 600° C. for 1 hour; Subsequently, calcining the precipitate again by flowing 30 mL/min air into the calcinatory under 600° C. for 30 minutes; and Step S7: obtaining the catalyst sample consisting of $CeZrO_2$ support and Ni active metal.

Related measurement data of the 5 catalyst samples are listed in following Table (3-1) and Table (3-2). From Table (3-1) and Table (3-2), it is able to find that, the Ni dispersion exhibited by catalyst sample No. 2 is greater than the dispersion value measured from the other catalyst samples. Moreover, the particle size of NiO, $CeO_2$ and $ZrO_2$ contained by catalyst sample No. 2 is also smaller than the particle size of NiO, $CeO_2$ and $ZrO_2$ contained by the other catalyst samples. It is worth noting that, to fabricate the catalyst sample No. 2, it prepares the $Ni(NO_3)_2 \cdot 6H_2O$, the $Ce(NO_3)_3 \cdot 6H_2O$, and the $ZrO(NO_3)_2 \cdot xH_2O$ by the first weight ratio of 30:20:50 in above-mentioned step S1. However, resulted from the loss of second metal (Ce) and first metal (Zr) during process, the real weight percent of the active metal (Ni), the second metal (Ce) and the first metal (Zr) measured from the fabricated catalyst sample No. 2 is 30.32%, 17.81% and 28.8%.

TABLE 3-1

| Catalyst sample | | Real weight percent (wt %) | | |
| --- | --- | --- | --- | --- |
| No. | Notation | Ni | Ce | Zr |
| 1 | NCZ(3-0-7) | 29.71 | — | 41.72 |
| 2 | NCZ(3-2-5) | 30.32 | 17.81 | 28.8 |
| 3 | NCZ(3-3.5-3.5) | 30.38 | 30.48 | 20.22 |
| 4 | NCZ(3-5-2) | 29.93 | 16.94 | 9.73 |
| 5 | NCZ(3-7-0) | 30.05 | 31.17 | — |

TABLE 3-2

| Catalyst sample | | Particle size (nm) | | dispersion |
| --- | --- | --- | --- | --- |
| No. | Abbreviated Symbol | crystal plane of NiO (111) | crystal plane of $CeO_2(111)$ and $ZrO_2(111)$ | (%) Ni |
| 1 | NCZ(3-0-7) | 6.2 | 7.18 | 1.93 |
| 2 | NCZ(3-2-5) | 5.7 | 6.87 | 19.80 |
| 3 | NCZ(3-3.5-3.5) | 11 | 11.41 | 7.89 |
| 4 | NCZ(3-5-2) | 6.2 | 5.65 | 9.08 |
| 5 | NCZ(3-7-0) | 17.5 | 14.4 | 2.55 |

Figure 2:
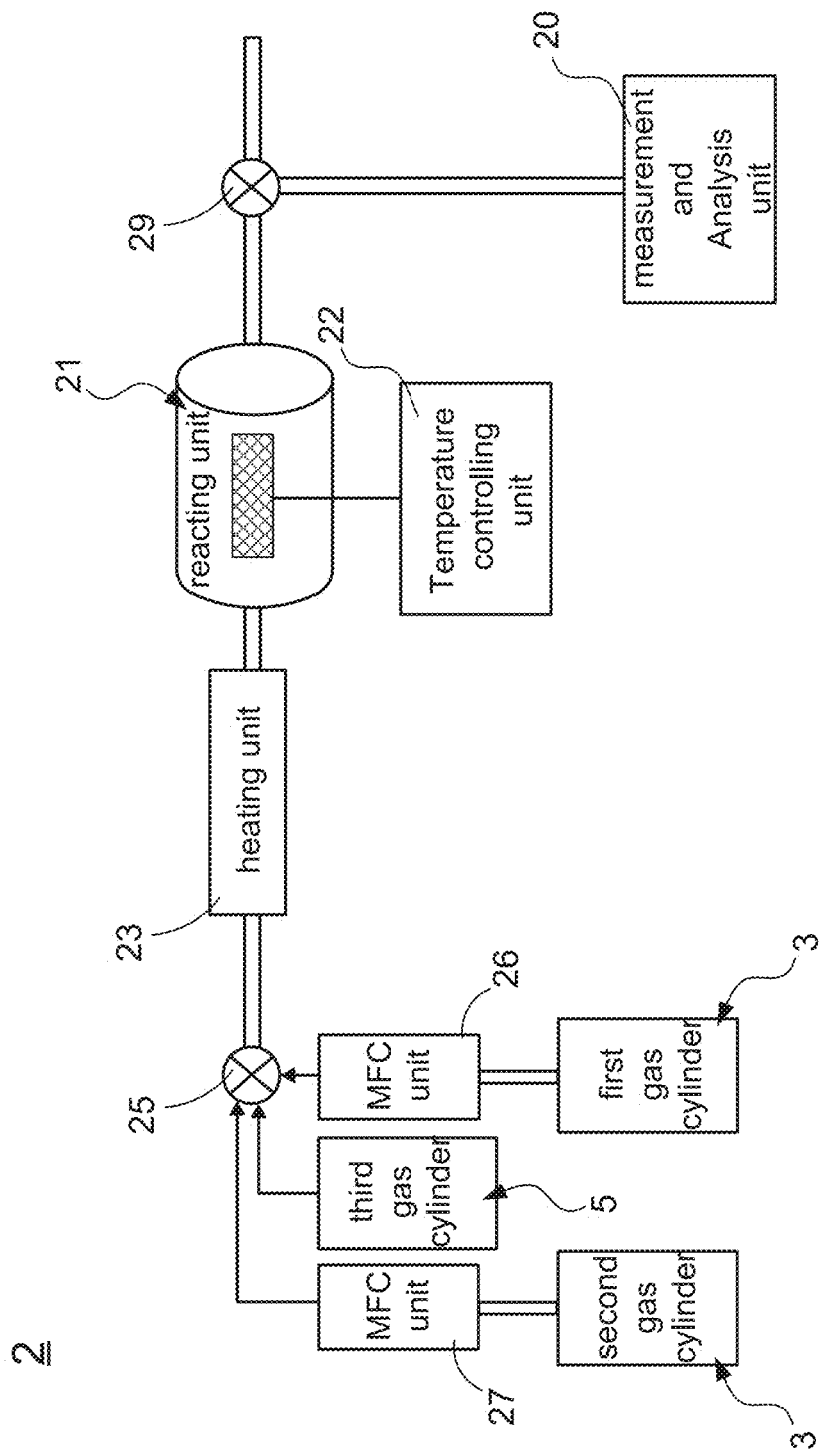
FIG. 2 shows a schematic framework view of a reactor for producing hydrogen by partial oxidation of butane (POB)

A variety of experimental data will be provided in following paragraph in order to prove that the novel catalyst can indeed be applied in hydrogen production by partial oxidation of light hydrocarbon (POLH) for effectively reducing the startup temperature of the POLH. Please refer to FIG. 2, which illustrates a schematic framework view of a reactor for producing hydrogen by partial oxidation of butane (POB). As FIG. 2 shows the reactor 2 comprising: a reacting unit 21 with a fixed bed, a temperature controlling unit 22, a heating unit 23, a first a first gas valve 25, a first mass flow controller (MFC) 26, a second mass flow controller (MFC) 27, a second gas valve 29, and a measurement and analysis unit 20.

The novel catalyst of 0.1 g is disposed on the fixed bed in the reacting unit 21 through a quartz wool, and the flow rate of oxygen ($O_2$) and butane ($C_4H_{10}$) provided by a first gas cylinder 3 and a second gas cylinder 4 is properly controlling by the first MFC unit 26 and the second MFC unit 27, so as to make the ratio of $nO_2/nC_4H_{10}$ in the reacting unit 21 be ranged from 1.5 to 2.4. Moreover, the flow rate of carrier gas (i.e., Ar) provided by a third gas cylinder 5 is controlled at 100 sccm by the first gas valve 25. The three gases are pre-heated by the heating unit 23 before being filled into the reacting unit 21. Furthermore, after the three gases get into the reacting unit 21, the internal temperature of the reacting unit 21 is increased to a startup temperature for stimulating POB reaction by using the temperature controlling unit 22. Eventually, products generated by the POB reaction are analyzed by the measurement and analysis unit 20.

Figure 3:
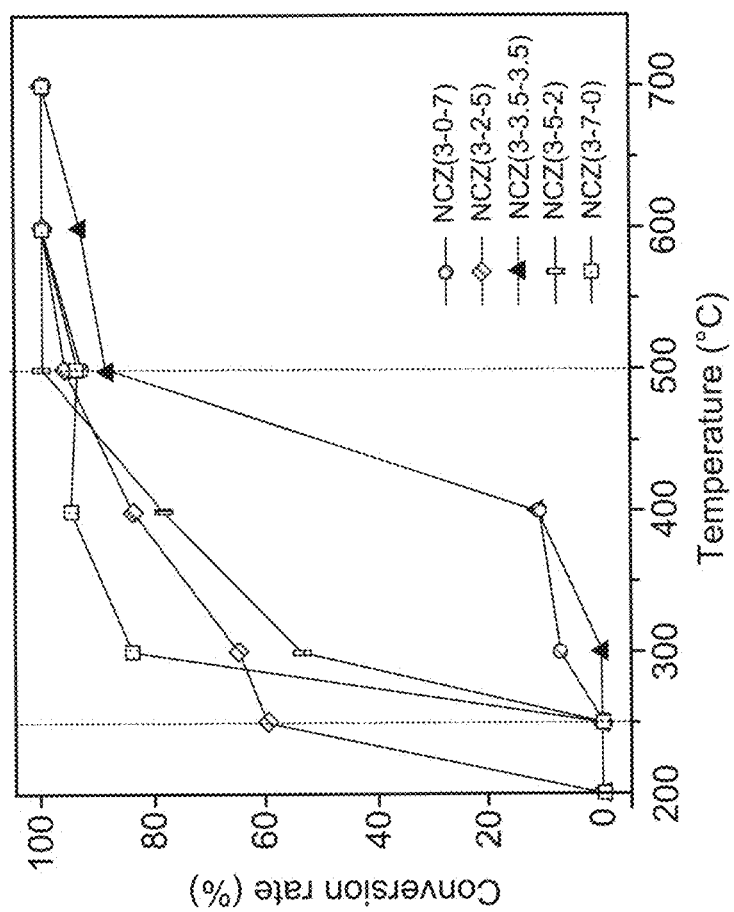
FIG. 3 shows a first data curve plot of temperature versus butane conversion rate.
Figure 4:
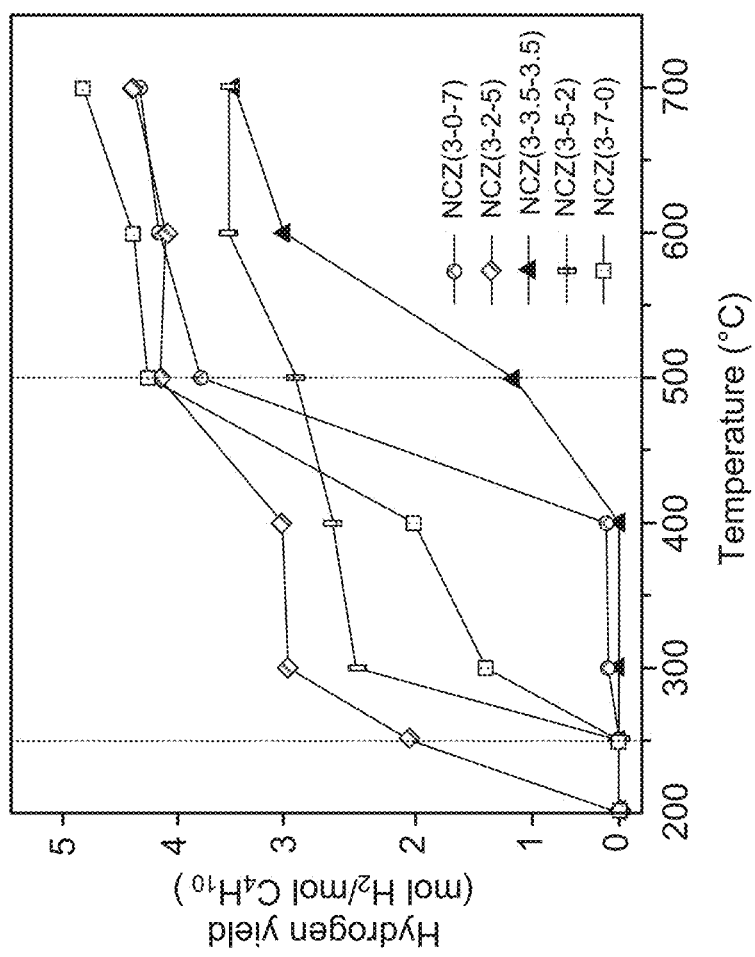
FIG. 4 shows a first data curve plot of temperature versus hydrogen yield.

With reference to FIG. 3, which illustrates a first data curve plot of temperature versus butane conversion rate; moreover, please simultaneously refer to FIG. 4, where a first data curve plot of temperature versus hydrogen yield is shown. From the data of FIG. 3 and FIG. 4, it is able to find that, when the internal temperature of the reacting unit 21 increases to around 250° C., catalyst sample No. 2 activate the POB reaction and then 60 percent of butane is converted to hydrogen with yield of 2. It is worth noting that, hydrogen with yield of 4.25 is produced while the internal temperature of the reacting unit 21 is increased to 500° C. for making 95% butane be treated with a conversion process by the POB reaction. So that, after comparing the data of FIG. 3 and FIG. 4 with above-presented Table (1), the person skilled in hydrogen production by partial oxidation of butane (POB) is able to understand that, this novel catalyst can indeed be applied in hydrogen production by partial oxidation of light hydrocarbon (POLH) and effectively reduced the startup temperature of the POLH.

Furthermore, catalyst sample No. 6 is also made in order to verify whether 30 wt % is the best weight percent of the active metal (Ni) used in fabricating the novel catalyst or not. The first weight ratio of Ni, Ce and Zr for making the catalyst samples No. 2 and No. 6 are listed in following Table (4). Thus, the person skilled in development and manufacture of catalyst can know that, the obvious discrepancy between the No. 2 catalyst and the No. 6 catalyst is just the weight percent of active metal Ni.

TABLE 4

| Catalyst sample | | weight ratio | | | |
|---|---|---|---|---|---|
| | Abbreviated | (%) | | | Ce/Zr |
| No. | Symbol | Ni | Ce | Zr | ratio |
| 2 | NCZ(3-2-5) | 30 | 20 | 50 | 0.4 |
| 6 | 15NCZ | 15 | 24 | 61 | 0.393 |

Figure 5:
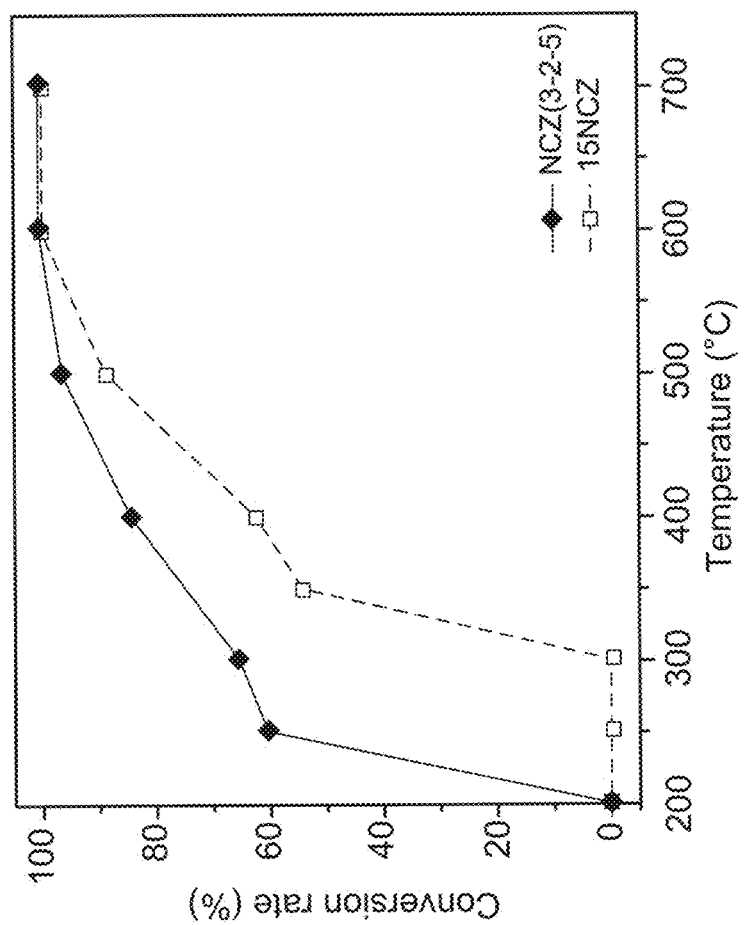
FIG. 5 shows a second data curve plot of temperature versus butane conversion rate.
Figure 6:
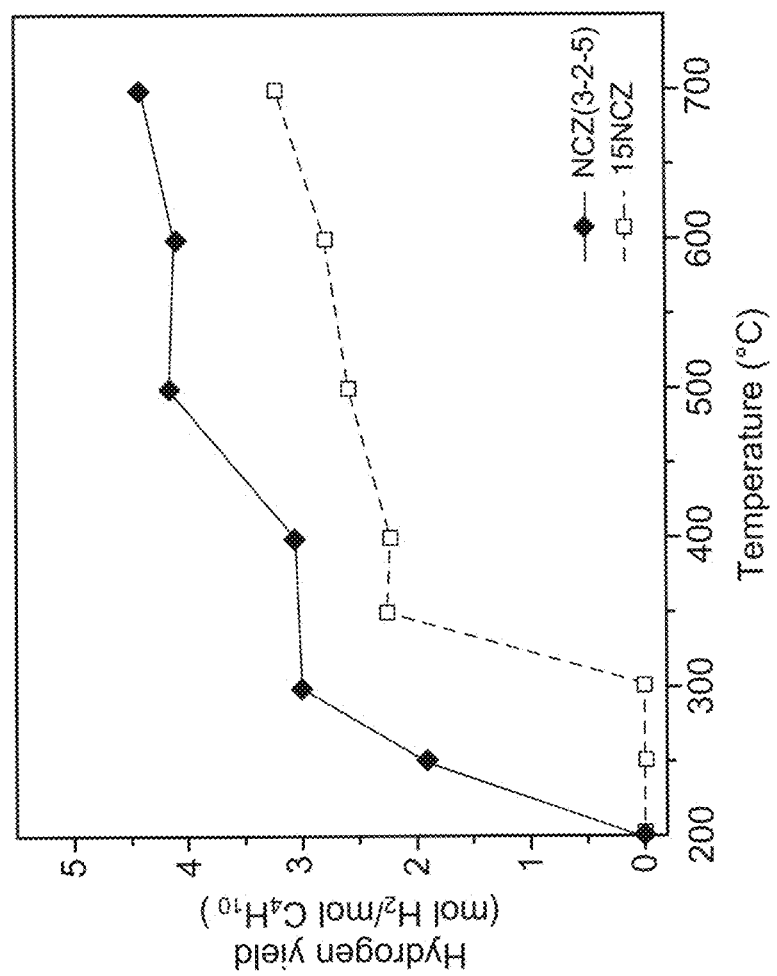
FIG. 6 shows a second data curve plot of temperature versus hydrogen yield.

Continuously referring to FIG. 5, which illustrates a second data curve plot of temperature versus butane conversion rate; moreover, please simultaneously refer to FIG. 6, where a second data curve plot of temperature versus hydrogen yield is shown. From the data of FIG. 5 and FIG. 6, it is able to find that, when the internal temperature of the reacting unit 21 increases to around 250° C., catalyst sample No. 2 activate the POB reaction and then 60 percent of butane is converted to hydrogen with yield of 2, but the catalyst sample No. 6 still cannot stimulate the POB reaction. On the other hand, hydrogen with yield of 4.25 is produced while the internal temperature of the reacting unit 21 is increased to 500° C. for making 95% butane be treated with a conversion process by the POB reaction. However, there has only 83% butane be converted to hydrogen with yield of 2.4 in the reacting unit 21 provided with the No. 6 catalyst on the fixed bed. Therefore, the data of FIG. 5 and FIG. 6 have proved that the best first weight ratio of Ni, Ce, and Zr for fabricating the novel catalyst of the present invention is 30:20:50.

Herein, it needs to explain that, despite the above-presented experimental data showing the first embodiment of the novel catalyst comprising an active metal Ni and a support consisting of $ZrO_2$ and $CeO_2$, the $CeO_2$ can be replaced by others fluorite-type oxide such as hafnium oxide ($HfO_2$) or thorium oxide ($ThO_2$). On the other hand, it is able to further add a stabilizer for making the zirconia ($ZrO_2$) become a stabilized zirconia, wherein the stabilizer can be calcium oxide (CaO), magnesium oxide (MgO), yttrium oxide ($Y_2O_3$), or cerium oxide ($CeO_2$).

Second Embodiment

The second embodiment of the novel catalyst is obtained by adding a second active metal into the above-mentioned first embodiment, wherein the second active metal, the first active metal (Ni), the second metal (Ce), and the first metal (Zr) have a second weight ratio ranged between 0:30:0:70 and 1:30:70:0. The second weight ratio of the second active metal (Pt), the first active metal (Ni), the second metal (Ce), and the first metal (Zr) for making the catalyst samples No. 7 is listed in following Table (5). Thus, according to the provided method steps and the second weight ratio, engineers skilled in the development and fabrication of catalyst can easily to carry out the production of catalyst sample No. 7.

TABLE 5

| Catalyst samples | | Second weight ratio | | | |
|---|---|---|---|---|---|
| | Abbreviated | (%) | | | |
| No. | Symbol | Pt | Ni | Ce | Zr |
| 7 | P1NCZ | 1 | 30 | 20 | 49 |

Figure 7:
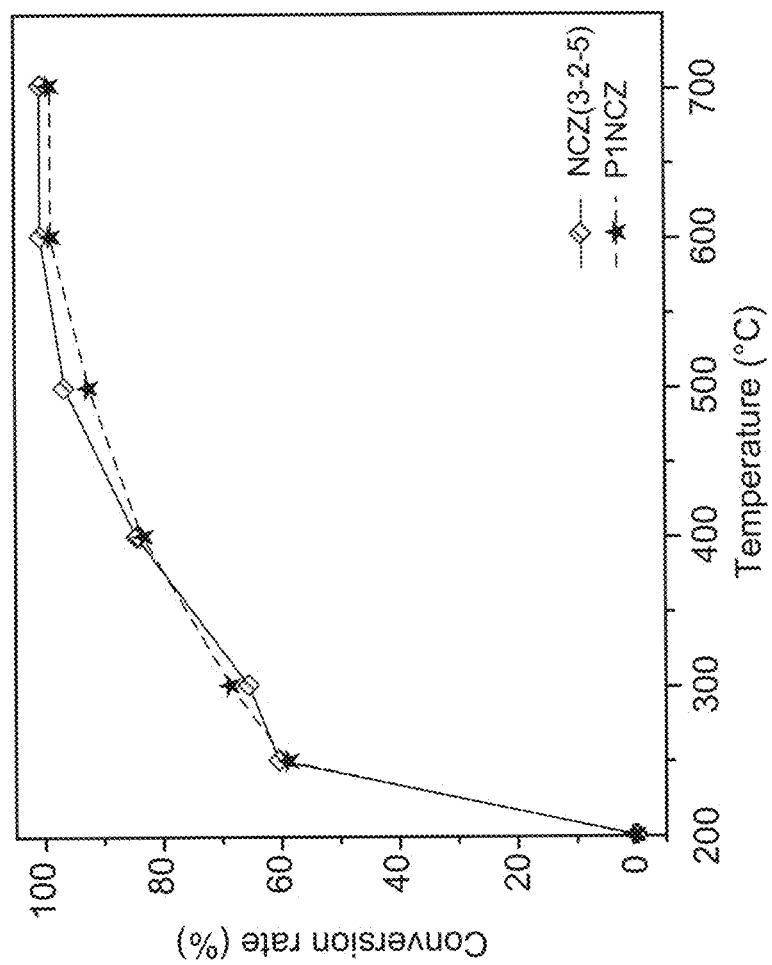
FIG. 7 shows a third data curve plot of temperature versus butane conversion rate.
Figure 8:
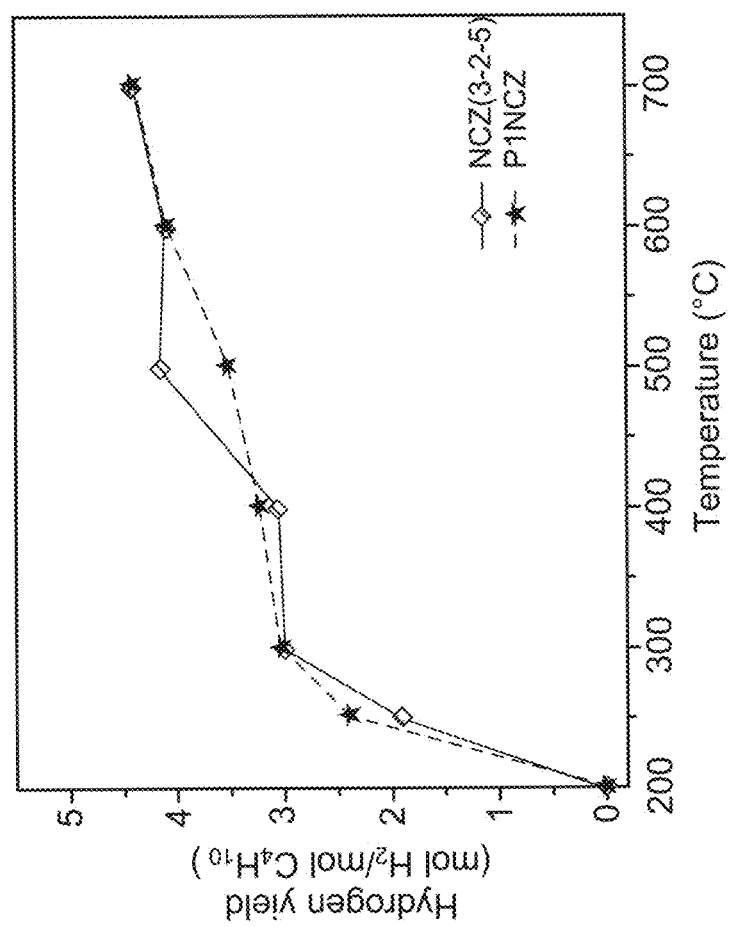
FIG. 8 shows a third data curve plot of temperature versus hydrogen yield.

Although the above-presented Table (5) showing the material of second active metal is platinum (Pt), that is not used for limiting the constitution of the second embodiment of the novel catalyst, the material of second active metal can also be gold (Au), palladium (Pd), rhodium (Rh), ruthenium (Ru), or iridium (Ir). Continuously referring to FIG. 7, which illustrates a third data curve plot of temperature versus butane conversion rate; moreover, please simultaneously refer to FIG. 8, where a third data curve plot of temperature versus hydrogen yield is shown. From the data of FIG. 7 and FIG. 8, it is able to find that, when the internal temperature of the reacting unit 21 increases to around 250° C., both the No. 2 catalyst and the No. 7 catalyst activate the POB reaction. Moreover, either No. 2 catalyst or No. 7 catalyst can make 93% or above butane be converted to $H_2$ gas while the internal temperature of the reacting unit 21 is increased to 500° C.

Figure 9:
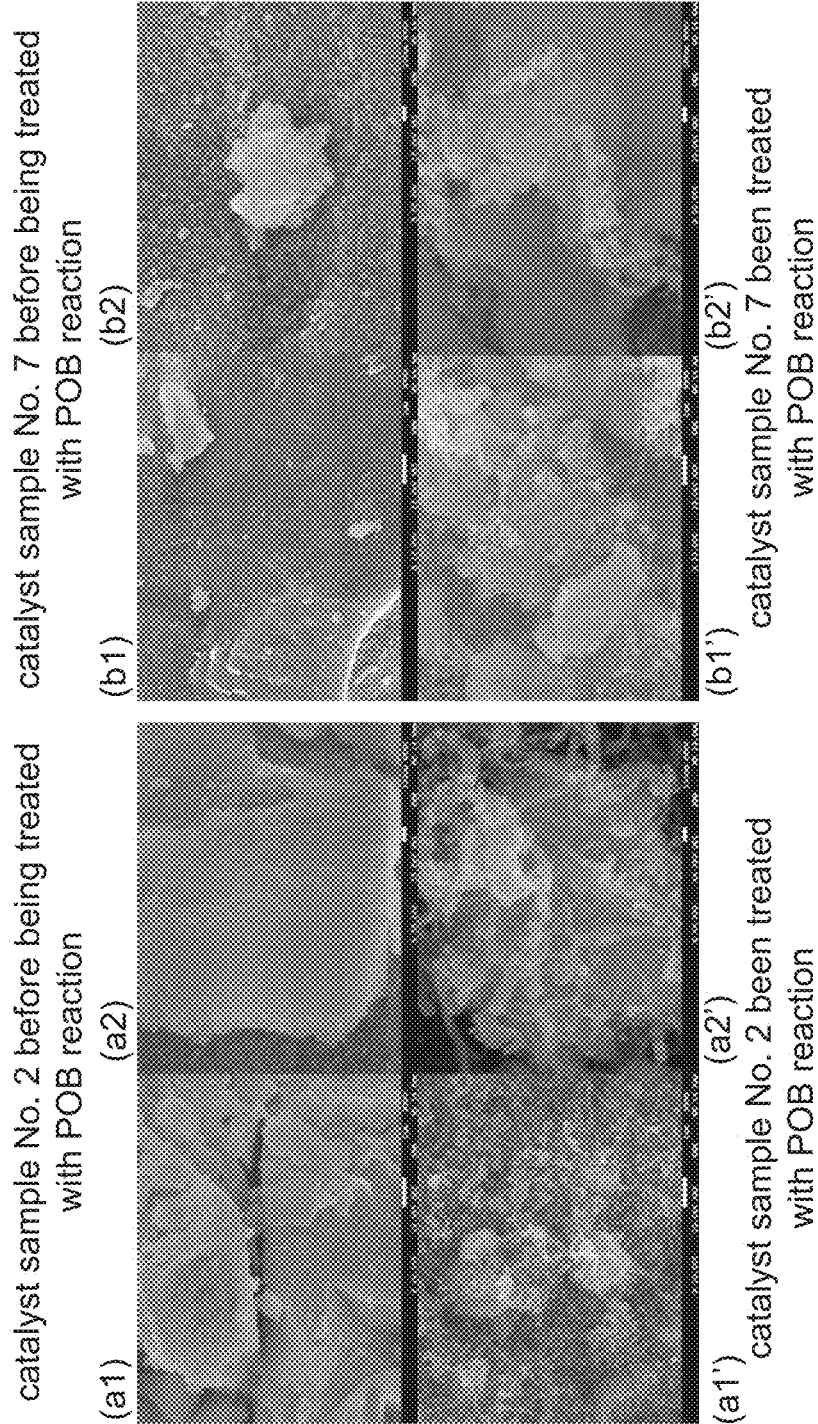
FIG. 9 shows images of catalyst samples No. 1 and No. 7 obtained by using scanning electron microscope (SEM).

It is worth explaining that, the inventors particularly modulate the ratio of O:C in the reacting unit 21 to 1 by using the second MFC unit 27 and the first MFC unit 26 (as shown in FIG. 2), and adjust the internal temperature of the reacting unit 21 to 400° C. through the temperature controlling unit 22. FIG. 9 shows images of catalyst samples No. 1 and No. 7 obtained by using scanning electron microscope (SEM), wherein images (a1) and (a2) exhibit that No. 2 catalyst has a flat and smooth surface before being treated with POB reaction. However, from images (a1') and (a2'), it can find that a plurality of carbon filaments and nanotubes occur on the No. 2 catalyst's surface, that means the carbon deposition is formed on the catalyst during the high temperature POB reaction.

On the other hand, images (b1) and (b2) exhibit that No. 7 catalyst also has a flat and smooth surface before being treated with POB reaction. It is worth noting that, from images (b1') and (b2'), it can find that the No. 7 catalyst's surface merely formed with a few of carbon filaments and nanotubes while the high temperature POB reaction is completed. Following Table (6) records the data of carbon deposition and related deposition rate, and such data have proved the adding of noble metal Pt can effectively solve the problem of carbon deposition occurring on the No. 2 catalyst's surface.

TABLE 6

| Catalyst sample | | Carbon | |
|---|---|---|---|
| No. | Abbreviated Symbol | deposition (g/g) | Deposition Rate (g/g · hour) |
| 2 | NCZ(3-2-5) | 65 | 0.396 |
| 7 | P1NCZ | 16 | 0.172 |

Therefore, through above descriptions, the catalyst for being applied in hydrogen production by low temperature partial oxidation of light hydrocarbon (POLH) provided by the present invention has been introduced completely and clearly; in summary, the present invention includes the advantages of:

(1) Differing from the startup temperature of partial oxidation of butane (POB) reaction stimulated by conventional rhodium-based or nickel-based catalyst reaches 700° C. or above, the present invention particularly discloses a novel catalyst consisting of fluorite-type oxide support and Ni active metal for being applied in hydrogen production by low temperature partial oxidation of light hydrocarbon (POLH), so as to effectively reduce the startup temperature of the POLH reaction. In the present invention, the said light hydrocarbon means methane, ethane, propane, or butane. Moreover, a variety of experimental data have proved that this novel catalyst makes the startup temperature of POB reactions be lowered to 250° C.

(2) On the other hand, the experimental data have also proved that, the carbon deposition formed on the catalyst during POB reaction can be obviously improved after adding a few amount of platinum into the constituting ingredients of the novel catalyst.

The above description is made on embodiments of the present invention. However, the embodiments are not intended to limit scope of the present invention, and all equivalent implementations or alterations within the spirit of the present invention still fall within the scope of the present invention.

What is claimed is:

1. A catalyst for use in hydrogen production by low temperature partial oxidation of light hydrocarbon, comprising:
    an oxide support, comprising a first metallic oxide and a second metallic oxide;
    wherein the first metallic oxide is zirconia ($ZrO_2$), and the second metallic oxide being a fluorite-type oxide selected from the group consisting of cerium oxide ($CeO_2$), hafnium oxide ($HfO_2$) and thorium oxide ($ThO_2$); and
    a first active metal, being nickel (Ni) and carried by the oxide support;
    wherein the first active metal, a first metal contained by the first metallic oxide, and a second metal contained by the second metallic oxide have a first weight ratio, and the first weight ratio being selected from the group consisting of 30:50:20, 30:35:35 and 30:20:50.

2. The catalyst of claim 1, further comprising a second active metal, and the second active metal, the first active metal, the first metal, and the second metal having a second weight selected from the group consisting of 1:30:50:20, 1:30:35:35 and 1:30:20:50.

3. The catalyst of claim 2, wherein the second active metal is selected from the group consisting of gold (Au), palladium (Pd), platinum (Pt), rhodium (Rh), ruthenium (Ru), and iridium (Ir).

4. The catalyst of claim 1, wherein the said light hydrocarbon is selected from the group consisting of methane, ethane, propane, butane, and combination of the aforesaid two or more hydrocarbons.

5. The catalyst of claim 1, catalyst of claim 1, wherein the first metallic oxide further comprises a stabilizer for making the zirconia become a stabilized zirconia.

6. The catalyst of claim 5, wherein the stabilizer is selected from the group consisting of calcium oxide (CaO), magnesium oxide (MgO), yttrium oxide ($Y_2O_3$), and cerium oxide ($CeO_2$).

* * * * *